UNITED STATES PATENT OFFICE.

RUDOLF SCHWABE, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

HEXAMETHYLENETETRAMIN SALTS OF THE α-PHENYLQUINOLIN-γ-CARBOXYLIC ACIDS.

1,076,160.   Specification of Letters Patent.   Patented Oct. 21, 1913.

No Drawing.   Application filed October 21, 1912.   Serial No. 727,048.

*To all whom it may concern:*

Be it known that I, RUDOLF SCHWABE, Ph. D., chemist, a citizen of the Empire of Germany, residing at Höchst-on-the-Main, Germany, have invented certain new and useful Improvements in Hexamethylenetetramin Salts of the α-Phenylquinolin-γ-Carboxylic Acids, of which the following is a specification.

I have found that by combining hexamethylenetetramin with α-phenyl-quinolin-γ-carboxylic acid or its derivatives, compounds are obtained which are very valuable for therapeutic purposes and which have proved to be particularly useful in the treatment of gout. The general formula of the new compounds may be given as follows:

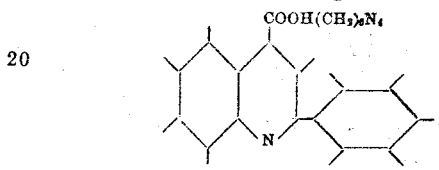

The new compounds are produced by combining the aforesaid carboxylic acids containing the atom group:

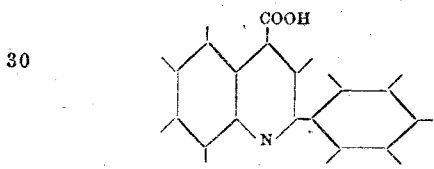

with the equimolecular proportion of hexamethylenetetramin in a suitable solvent, whereupon they can be isolated from the solution by crystallization or precipitation. They are white, crystalline compounds, which are readily soluble in hot alcohol, difficultly soluble in water, insoluble in ether, but dissolving in alkalis and in an excess of diluted hydrochloric acid. By adding a small quantity of diluted hydrochloric acid the carboxylic acid is recovered from the compounds. They are of a bitter astringent taste.

The following example illustrates my invention: 70 parts by weight of hexamethylenetetramin are boiled with 15 times its weight of absolute alcohol and there are then added 125 parts of α-phenylquinolin-γ-carboxylic acid, whereupon a solution is formed from which, on cooling, the new compound: α-phenyl-quinolin-γ-carboxylate of hexamethylenetetramin crystallizes out. Its formula may be given as follows:

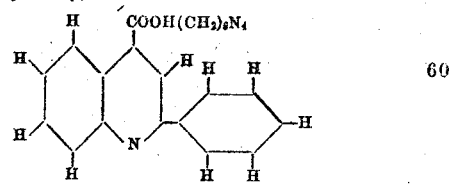

It forms small crystals, soluble in hot water and alcohol, insoluble in ether, melting and decomposing at about 185° C.

In the same manner may, for instance, be used the p-methoxyphenyl-cinchonic acid for preparing an analogous compound.

Having now described my invention, what I claim is:

1. As new products, the compounds of carboxylic acids containing the atom group:

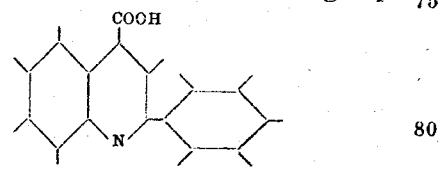

with hexamethylenetetramin, being white crystalline bodies, readily soluble in hot alcohol, difficultly soluble in water, insoluble in ether, soluble in alkalis and in an excess of diluted hydrochloric acid, decomposing on addition of a small quantity of diluted hydrochloric acid with formation of the carboxylic acid, and having a bitter astringent taste.

2. As a new product, the compound of the phenylquinolin-γ-carboxylic acid of the constitution:

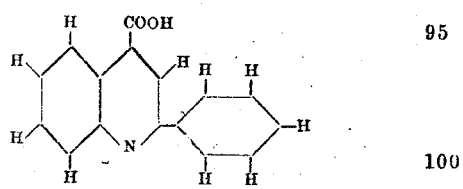

with hexamethylenetetramin, being a white crystalline body, which is readily soluble in hot alcohol, difficultly soluble in water, insoluble in ether, soluble in alkalis and an excess of diluted hydrochloric acid, separating on addition of a small quantity of diluted hydrochloric acid the α-phenyl-quinolin-γ-carboxylic acid, being of a bitter astringent taste.

In testimony whereof, I affix my signature in presence of two witnesses.

RUDOLF SCHWABE.

Witnesses:
 JEAN GRUND,
 CARL GRUND.